US011662432B2

(12) United States Patent
Elran et al.

(10) Patent No.: US 11,662,432 B2
(45) Date of Patent: May 30, 2023

(54) SYSTEM AND METHOD FOR POSITIONING OF A LASER PROJECTION SYSTEM

(71) Applicant: LIGHTYX SYSTEMS LTD., Tel Aviv (IL)

(72) Inventors: Tomer Shaul Elran, Petah-Tikva (IL); Uri Yehuday, Holon (IL)

(73) Assignee: LIGHTYX SYSTEMS LTD., Tel Aviv (IL)

(*) Notice: Subject to any disclaimer, the term of this patent is extended or adjusted under 35 U.S.C. 154(b) by 0 days.

(21) Appl. No.: 17/676,554

(22) Filed: Feb. 21, 2022

(65) Prior Publication Data
US 2022/0179052 A1 Jun. 9, 2022

Related U.S. Application Data

(63) Continuation of application No. PCT/IL2020/050910, filed on Aug. 19, 2020.

(60) Provisional application No. 62/895,518, filed on Sep. 4, 2019, provisional application No. 62/889,054, filed on Aug. 20, 2019.

(51) Int. Cl.
*G01C 15/00* (2006.01)
*G01S 7/481* (2006.01)

(52) U.S. Cl.
CPC .......... *G01S 7/4813* (2013.01); *G01C 15/008* (2013.01)

(58) Field of Classification Search
None
See application file for complete search history.

(56) References Cited

U.S. PATENT DOCUMENTS

| 2006/0182314 | A1* | 8/2006 | England | G06T 15/00 |
| | | | | 382/106 |
| 2013/0096873 | A1 | 4/2013 | Rosengaus et al. | |
| 2016/0291160 | A1 | 10/2016 | Zweigle et al. | |
| 2018/0202805 | A1 | 7/2018 | Unger et al. | |
| 2019/0056215 | A1 | 2/2019 | Hayes et al. | |
| 2019/0114798 | A1* | 4/2019 | Afrouzi | G05D 1/0088 |

FOREIGN PATENT DOCUMENTS

WO    WO 2018/229769    12/2018

OTHER PUBLICATIONS

International Search Report for PCT Application No. PCT/IL2020/050910, dated Feb. 21, 2021.

* cited by examiner

*Primary Examiner* — Hovhannes Baghdasaryan
(74) *Attorney, Agent, or Firm* — Pearl Cohen Zedek Latzer Baratz LLP

(57) ABSTRACT

A survey tool for determining position and orientation (P&O) thereof relative to a construction site is provided herein. The survey tool may include: a moveable platform wherein the moveable platform is configured to rotate at least one two-axis electro-optic deflection unit mounted on the moveable platform; at least one light source coupled to the two-axis electro-optic deflection unit configured to project a light beam, wherein steering of the light beam is carried out by operating at least one of: the two-axis electro-optic deflection unit, and the moveable platform, and wherein the light beam forms a projection onto surfaces within the construction site; at least one sensor configured to record at least one of: a steering angle and, a distance between the survey tool and said point; and at least one computer processor configured to determine the P&O of the survey tool relative to the construction site.

18 Claims, 10 Drawing Sheets

SYSTEM AND METHOD FOR POSITIONING OF A LASER PROJECTION SYSTEM

CROSS REFERENCE TO RELATED APPLICATIONS

This application is a continuation of PCT Application No. PCT/IL2020/50910, filed on Aug. 19, 2020, which claims the benefit of U.S. provisional patent application Ser. No. 62/889,054, filed on Aug. 20, 2019, and of U.S. provisional patent application Ser. No. 62/895,518, filed on Sep. 4, 2019, all are incorporated herein by reference in their entireties.

FIELD OF THE INVENTION

The present invention relates generally to the field of augmented reality projection, and more specifically, to a system and method for registering and positioning a laser projector.

BACKGROUND OF THE INVENTION

Most standard construction processes involve two principal stages, namely a design stage and a build stage. In the design stage, an architect typically plans the layout and composition of a structure and possibly proposes a construction timeframe or schedule. In the build stage, a contractor, possibly assisted by a team of builders, implements the architectural plan and thereby builds the structure and/or associated facilities according to the specification and schedule provided.

In order to ensure that the resultant structure matches the architectural plans as closely as possible, build stages are often very slow and may entail a plurality of surveyors regularly assessing and measuring aspects of the construction to obviate the emergence or continuation of plan divergence. This is generally important as, should significant unintended plan divergence occur, there may be limited opportunity to rectify the construction (e.g., the building structure, pipework, and the like) later on during the build cycle. In particular, certain levels of plan divergence could impede structural integrity and moreover necessitate substantial modification, overhaul or even rebuild. In some circumstances, particularly where there are strict timeframes or budgets at play, plan divergence may be prohibitively expensive or timely to rectify and moreover could result in the construction project being completed late, over-budget and/or remain unfinished.

In order to improve build accuracy and efficiency, a number of known electronic devices are often employed during build projects, such as laser distance meters and three-dimensional (3D) reconstruction tools. These electronic devices are however cumbersome, insufficiently accurate and sometimes unwieldy to use, and moreover often address localized, rather than macroscopic, aspects of the construction.

More recent developments include the so-called "Adaptive Projected Reality" (APR) approach, as originally disclosed by LightYX Systems Ltd in International Publication Number WO 2018/229769 A1, which is incorporated herein by reference. Devices incorporating APR techniques are growing in prevalence and popularity and are typically characterized by features enabling the real-time projection of visual instructions and/or images onto one or more surfaces in a scene. APR devices may moreover be capable of adaptively changing and aligning their projected content relative to varying environments in accordance with plans or build schematics.

APR devices typically utilize laser systems, such as laser projectors or survey tools, to mark accurate points, shapes, or even entire plans within a construction site. Such systems usually require knowledge of reference features within the construction site in order to conduct a registration process and thereby position themselves within the build space such that they may project plans accurately in alignment with the environment.

One way to carry out the registration process is to use two or more (preferably three) reference points or reference features whose exact position is already known. The challenge with such processes, however, is that the field of view (FOV) of the laser projector is typically limited comparative to the dimensions of the overall construction site and so several projection sessions may be required in order to register the entire scene. This is especially true in circumstances where the reference points of the construction site cannot all be contained within a single FOV of the projector. A further challenge may arise in circumstances where the light projector is relocated within the construction site, thereby necessitating the user to conduct a fresh, often time consuming, re-registration process.

The registration process additionally requires the laser system to determine its precise position within and relative to the construction site. The laser system is therefore typically configured to direct laser beams directly at each of the reference points or reference features within the construction site and to subsequently record the point distance and/or the angle of these reference points/features relative to the laser projector. A geometric computation involving a triangulation or trilateration process may then be conducted to calculate the exact laser system location within the build space.

In order to acquire each of the reference points/features, current methods usually involve an operator manually controlling the system axes in order to point the laser system towards the reference points/features. This is generally an undesirably slow process and, owing to human input, is prone to operator induced error. In an alternative approach, the operator may hold a reflector prism and physically place the prism on every reference point/feature while the laser system tracks the reflector. This approach, although less intensive, is still prohibitively slow and prone to operator induced error.

Another method may involve placing reflective target stickers atop each of the reference points/features and instructing the laser system to scan the entire range of its motion until all reference points are located. Whilst this method may be completed entirely autonomously (i.e., without human input or action), it is often undesirably slow to conduct and thus inefficient.

Accordingly, it is an object of the invention to propose a laser system having several axes of rotation and movement such that beams projected by the laser system may be pointed in almost any given direction within the build space. It is a further object of the invention to propose a means for expeditiously re-calibrating or re-registering laser systems to a new local environment following a re-positioning within the build space. It is a yet further object of the invention to propose a means for expeditiously and automatically locating one or more reference points within a construction site.

SUMMARY OF THE PRESENT INVENTION

In order to address the aforementioned drawbacks, some embodiments of the invention provide a device and related methods for automatically locating and zooming in on reference points/features in a fast and accurate manner without compromising on either accuracy or the speed of the process.

Further embodiments propose use of a two-axis electro-optic deflection unit and a moveable platform to control the resulting apparatus in an accurate and coordinated manner. More specifically, registration/calibration may be achieved by using a laser projector in a measuring mode, directing the light beam of the laser projector to two or more the reference points/features and measuring the angles and distance, before converting to projection mode and projecting the floor plan onto the registered surface. Using the combined two-axis electro-optic deflection unit and moveable platform arrangement, reference points/features beyond the initial FOV of the laser projector may be expeditiously localized, in particular by panning and tilting a combination of the two-axis electro-optic deflection unit and the moveable platform and measuring them, such that the registration/calibration is not limited to reference points within the initial FOV only.

Accordingly, some embodiments of the invention propose a survey tool for determining position and orientation (P&O) thereof relative to a construction site. The survey tool comprises: a support structure; a moveable platform connected to the support structure, wherein the moveable platform is configured to pan and tilt at least one two-axis electro-optic deflection unit mounted on the moveable platform; at least one light source coupled to the two-axis electro-optic deflection unit configured to project a light beam, wherein steering of the light beam is carried out by operating at least one of: the two-axis electro-optic deflection unit, and the moveable platform, and wherein the light beam forms a projection onto surfaces within the construction site comprising at least one of: a portion of a construction plan, or a specified pattern; at least one sensor configured to record at least one of: a steering angle of the light beam relative to the a specific part of the survey tool such as the support structure when aimed at a point on one of the surfaces within the construction site; and, a distance between the survey tool and said point; and, at least one computer processor configured to determine the P&O of the survey tool relative to the construction site, based on at least one of: said steering angle; and said distance.

Alternative embodiments of the invention propose a method of re-stationing a survey tool within a construction site. The method comprises: obtaining a floor plan of the construction site; obtaining coordinates of a first position of the survey tool within the construction site; scanning the construction site from the first position and therefrom constructing a position map of the first position; re-stationing the survey tool to a second position within the construction site; scanning the construction site from the second position and therefrom constructing a position map of the second position; and, calculating a displacement vector denoting the re-stationing of the survey tool from the first position to the second position by comparing the position map of the second position to the position map of the first position.

Yet further embodiments of the invention propose a method of re-stationing a survey tool within a construction site. The method comprises: obtaining a floor plan of the construction site; obtaining coordinates of a first position of the survey tool within the construction site; scanning the construction site from the first position and therefrom constructing a position map of the first position; registering the position map of the first position onto the floor plan, to yield a registered position map of the first position; re-stationing the survey tool to a second position within the construction site; scanning the construction site from the second position and therefrom constructing a position map of the second position; and, calculating a displacement vector denoting the re-stationing of the survey tool from the first position to the second position by comparing the position map of the second position to the registered position map of the first position. In this process the user can also get a "As Built" scan registered to the said coordinates. Usually it has high importance to have a registered scan of construction progress and accuracy.

An additional embodiment of the invention proposes a method for automatically locating a point with a survey tool within a construction site, the survey tool comprising a support structure, a moveable platform, a laser mounted on the moveable platform and a computer processor configured to control at least one of: a steering angle of the laser relative to a specific part of the survey tool such as the support structure; and a distance between the survey tool and the point. The method comprises: attaching at least one trackable indicator to a surface within the construction site to define said point at a predefined location, wherein the at least one trackable indicator comprises: an ultrasound (US) beacon, a radio frequency (RF) beacon, or a visual indicator; carrying out preliminary tracking for the point using one or more of: an US tracker, a RF tracker, or an optical tracker, to identify a sector of the construction site that includes the point; refining the preliminary tracking of the point by projecting a laser beam at the identified sector of the construction site; and, using an active or passive feedback mechanism in relation to the projected laser beam to determine an accurate direction of the point relative to the survey tool.

These and other advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF THE INVENTION

Figure 1B:
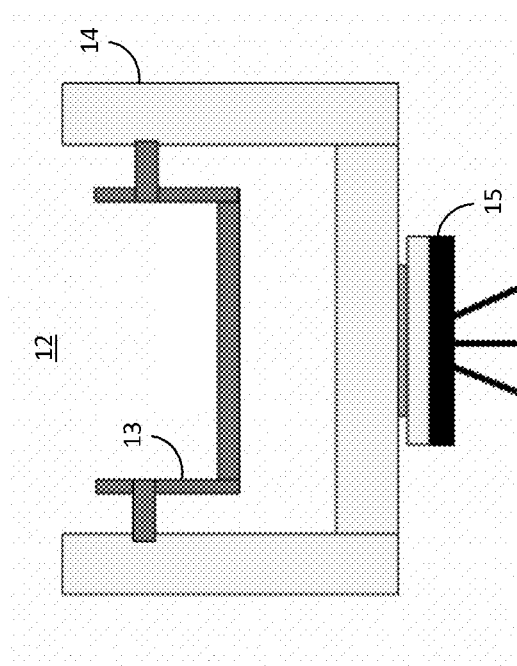
FIGS. 1A, 1B, 1C, 1D and 1E are high-level diagrams illustrating aspects of a laser projector in accordance with some embodiments of the present invention.
Figure 1A:
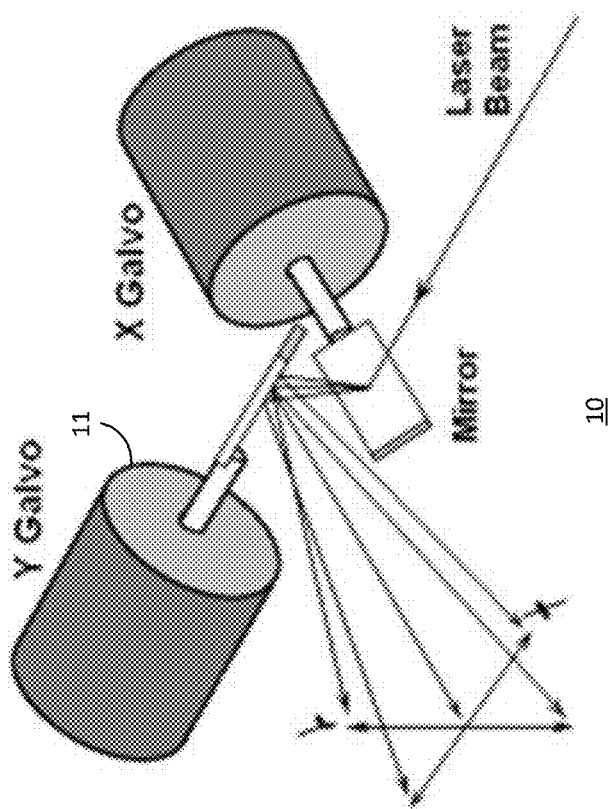
Figure 1D:
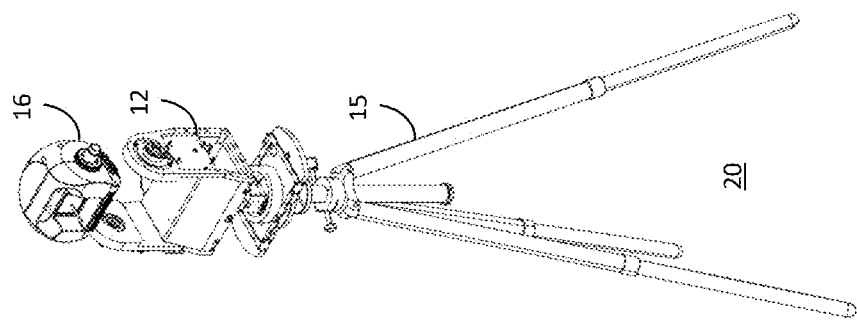
Figure 1C:
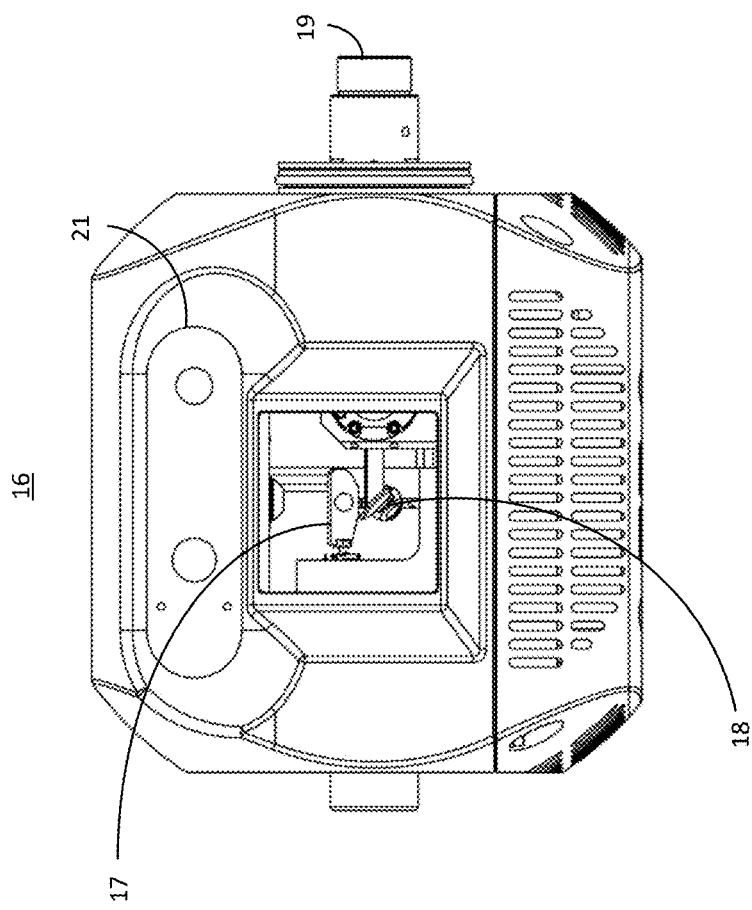
Figure 1E:
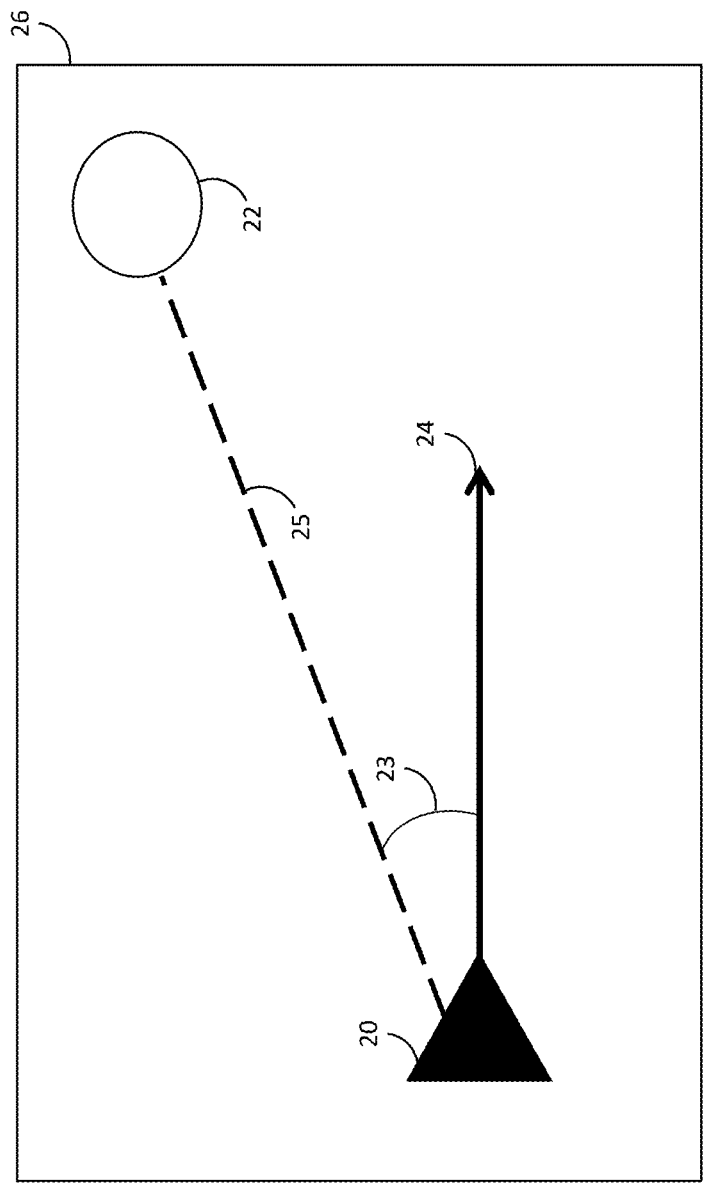

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Prior to setting forth the detailed description of the invention, the following term definitions are provided.

The term 'adaptive' as used herein refers generally to capability or susceptibility to undergo accordant change to improve fit or suitability. More specifically, in the present context 'adaptive' refers to the capacity of a system or tool to vary its output, for example its projected output, in accordance with a dynamic scene, environmental alterations or a movement of the device itself.

The terms 'augmented reality' and 'projected reality' refer generally to a direct or indirect view of a physical real-world environment whose elements have been augmented by overlaid computer-generated perceptual information. This perceptual information may, in particular, be presented using visual modes; however other modalities such as auditory, haptic, somatosensory and olfactory modes may also be employed. Overlaid sensory information may be constructive or destructive and thereby act to additively compliment features present in the environment, or otherwise act to obfuscate and mask features present in the environment.

The terms 'point', 'reference point' or 'reference feature' as used herein refer generally to a visual indicator that serves, as part of two or more (usually three) reference points, for a registration process of a light projector onto a scene. Specifically, a reference point in a construction site is a pre-defined and pre-measured point whose exact absolute position is known, for example relative to an Earth centered frame of reference, usually to within a sub-centimeter tolerance. The point may, for example, be set or measured by a surveyor or similarly skilled worker, or alternatively it may be an easily defined point or feature such as a wall corner which appears both in site and on plan, whose position is known within a few centimeter's (preferably sub-centimeter) tolerance.

The term 'two-axis electro-optic deflection unit' as used herein refers generally to an arrangement operable provide a pan-tilt mechanism involving, for example, deflecting a laser beam in an X and Y direction to produce a two-dimensional (2D) area in which the laser beam may be freely directed. The trajectory of the laser beam may typically be adjusted at a high speed, albeit may generally restricted to relatively narrow FOV. The deflection may be achieved using, for example, a two mirror arrangement where each mirror may be independently controlled and moved using a 'galvanometer scanner', 'MEMS scanner' or 'light scanner'.

The terms 'galvanometer scanner', 'MEMS scanner' or 'light scanner' as used herein refer generally to a device operable to control and move a set of mirrors in order to steer a laser beam. The steering of the beam may be two-dimensional and the mirrors may be used to generate a freely addressable motion, as in servo-controlled galvanometer scanners, sometimes referred to as vector scanning. To control the scanning motion, each scanner may require a rotary encoder, or other analogous form of angle and/or speed feedback, and control electronics that provide, for a desired angle or phase, the requisite electric current to the motor or galvanometer. A software system may be configured to control the scanning motion and, if 3D scanning is implemented, also the collection of the measured data. In order to position a laser beam in two dimensions, it is possible either to rotate one mirror along two axes—used mainly for slow scanning systems—or to reflect the laser beam onto two closely spaced mirrors that are mounted on orthogonal axes. Each of the two flat or polygonal mirrors may then driven by a galvanometer or by an electric motor. In some embodiments the 2 axis deflection unit might comprise an electro optic spatial light modulator, such as: transmissive liquid crystal, reflective liquid crystal on silicon (LCOS), DLP.

The term 'collimated beam of light' as used herein refers generally to a beam of light that comprises near parallel rays, and therefore will spread minimally as it propagates. A hypothetical perfectly collimated light beam, with no divergence, would in theory not disperse with distance; however such perfectly collimated light beams cannot be created in practice owing to diffraction effects. Laser beams are an example of a directional, collimated light beam. The divergence observed in high-quality laser beams is typically less than 1 milliradian.

The terms 'human-machine interface' (HMI) and 'user interface' as used herein refer generally to an input facility enabling interaction between humans and machines. The interface may, for example, refer to a graphical user interface (GUI) operable to receive instruction via an input device such as a mouse or touch screen. In the context of the present invention, interactions of this type allow for the effective operation and control of the machine, possibly in correspondence with information simultaneously fed back from the machine to the human in order to aid the operators' decision-making process.

The term 'image sensor' as used herein refers generally to a sensor that detects and conveys information used to make an image. It does so by converting the variable attenuation of light waves into signals, small bursts of current that convey the information. The waves may be light or other electromagnetic radiation.

Turning now to the detailed description, some embodiments of the present invention provide an Adaptive Projected Reality (APR) device for use by, for example, builders, appraisers, architects, engineers, surveyors, inspectors and the like. The APR device may be used to project desired construction plans onto a target surface for the purposes of, for example, improving the accuracy and efficiency with which builders may progress a construction.

FIGS. 1A, 1B, 1C, 1D and 1E are high-level diagrams illustrating an exemplary laser projector system or survey tool 20 in accordance with some embodiments of the present invention. The laser projection system 20 includes a laser projector arrangement 16 including a two-axis electro-optic deflection unit 10 and at least one light source, both of which are mounted 19 onto a moveable platform 12. The light source is preferably a low divergence light source operable to emit collimated beams of light. The two-axis electro-optic deflection unit is preferably formed from a set of cooperating mirrors 17, 18 and galvanometers 11 and, optionally, includes a 2D camera and/or depth camera 21a, 21b. The moveable platform 12 may be connected to and/or mounted on a support structure 15, such as a tripod, stand, vehicle, robot or the like. The support structure may be configured to remain stationary relative to a construction site 26. Alternatively, the support structure may be configured to move in a predetermined or derivable pattern (e.g., using proximity sensors, or the like) relative to the construction site 26. Moveable platform 12 may further comprise mechanisms to pan 14 and/or tilt 13 the two-axis electro-optic deflection mounted thereon relative to the support structure 15. The laser projection system may further include a computer controller and a set of reference features/points 22 which are positioned within the construction site 26 and, optionally, appear on the plan, for use in establishing the tool's exact position (usually within a sub-centimeter tolerance) and orientation relative to the construction site (i.e., within the three-dimensional space). The projection system 20 may be aligned semi-manually by pointing a laser beam 24 emitted by the light source to the reference features/points 22 and using the bearing/steering angle reading 23 of the projection system 20 relative to a specific part of the survey tool such as support structure 15 to register the system's position. Range readings 25 may also be obtained by directing the laser beam 24 through a mirror and measuring the 'time of flight' with a laser distance meter, which optionally may be incorporated in the projection system 20. To achieve bearing and/or range localization, the system may use an angle 23, a range 25 or a combination of both to compute its position and orientation where localization based on bearing angle involves a triangulation computation and where localization based on range involves a trilateration computation. It may also be aligned automatically by scanning the scene with laser beams, which may be reflected by one or more retro reflectors (positioned on the reference features/points) back along the same optical path to a photodetector, which in turn allows the system to "read" the position.

Once the projector system 20 verifies its position in the build space, it may be operated to accurately and adaptively project the outline of features and elements for assisting in the construction process. System software may also be included to store imported computer-aided design (CAD) outlines of the features and elements (walls, pipes, air condition and the like) and adjust the scale and shape (orientation) of the projected outline to account for the system's three-dimensional position and orientation within the build space.

The projector arrangement 16 and moveable platform 12 cooperate to facilitate beam steering and comprises accurate beam angle position sensors (mirror angle/speed sensor or similar) and also incorporate a laser distance meter in the galvanometric scanner. For each reference feature/point, a user may aim the laser/light beam 14 at the point 22. A computer processor (CPU) may then calculate accurate bearing/steering angle data relative to support structure 15 from both the projector and the pan 14 and tilt 13 mechanisms of the moveable platform 12 (utilizing an angular encoder, inclination sensor, accelerometer, gyroscope etc) and may also acquire range data from a laser distance meter. The CPU may then calculate the position and orientation of the projector system 20 relative to the build space/construction site 26 based on at least one of the steering angle and the distance.

Based on position, orientation and pre-defined CAD drawings, the projector system 20 may project plans such as, for example, a template or blueprint, and related information, accurately and in alignment with surfaces within the construction site 26. The light source and the two-axis electro-optic deflection unit 10 operate under common control of the computing system to register their respective locations using the array of reference points/targets/work object features, converting all location information into a common coordinate system, and projecting information on the work surface with directional light beams using the common coordinate system.

According to some embodiments of the invention, there is provided a system comprising a 2D light projector attached to a two-axis electro-optic deflection unit 10. The pan 14 and tilt 13 mechanisms of the moveable platform 12 may steer the projector in different orientations and enhance the projector coverage. A control system and user interface may also be provided to control the projector and, optionally, the pan 14 and tilt 13 mechanisms. The pan 14 and tilt 13 mechanism may further comprise accurate angle position sensors (encoder) or other similar methods of reading angle data.

Figure 2A:
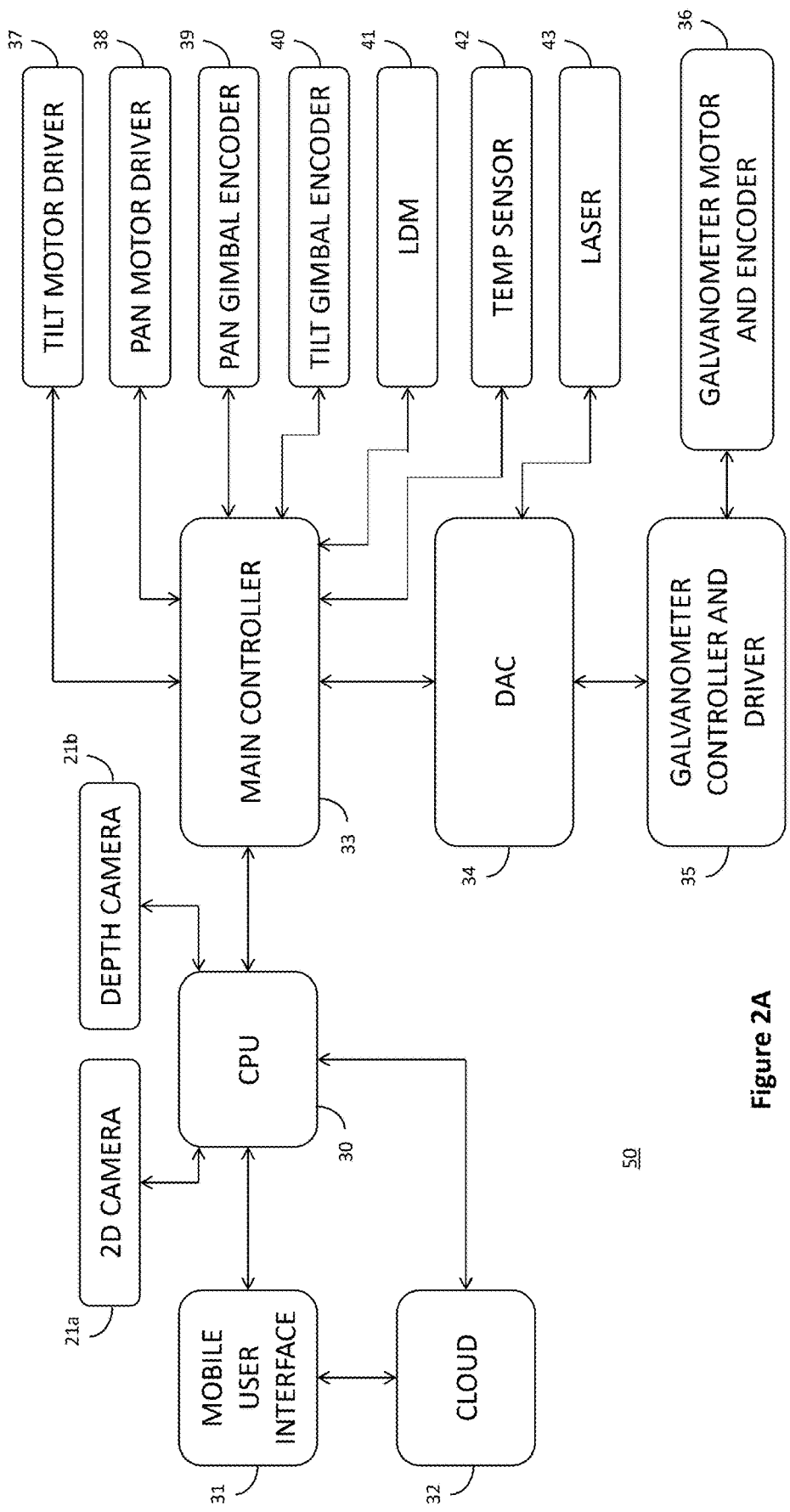
FIGS. 2A and 2B are high-level block diagrams illustrating a non-limiting system arrangement in accordance with embodiments of the present invention.
Figure 2B:
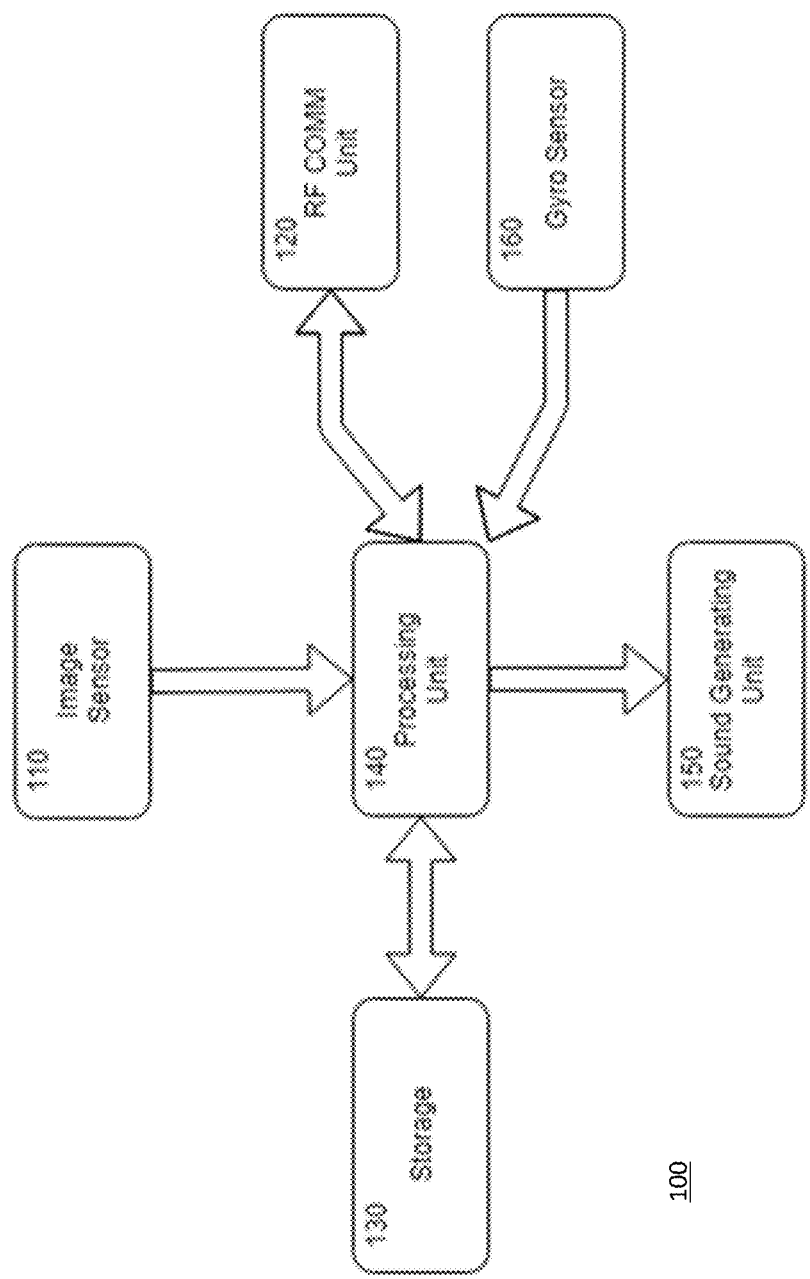

FIGS. 2A and 2B are high-level block diagrams illustrating non-limiting system arrangements 50, 100 in accordance with embodiments of the invention. System 50 for positioning and orientating a survey tool may include a central processing unit 30 operable to execute software and algorithms required to perform the operations explained throughout this disclosure. Operational instructions and commands may be issued to the system 50 by, for example, an operator over wired or wireless communication mediums using one or both of mobile user interface 31 and/or the cloud 32 and/or any storage device. Central processing unit 30 may be operably connected to a 2D camera 21a and/or a depth camera 21b and further to a main controller 33. Main controller 33 may be operably connected to motor drivers 37, 38 and encoders 39, 40 of the pan 14 and tilt 13 mechanisms of the moveable platform 12. Main controller may additionally be operably connected to one or more temperature sensors 42 and one or more laser distance measuring devices 41. Galvanometers 11 of the two-axis electro-optic deflection unit 10 may be controlled and measured by main controller 33, via a digital to analogue converter (DAC) 34, using galvanometer controller and driver 35 and galvanometer motor and encoder 36. Laser emitter 43 may additionally be controlled by main controller 33 via DAC 34.

System 100 for locating a point with a survey tool may include a processing unit 140 operable to execute software and algorithms required to perform the operations explained throughout this disclosure. The processing unit may take the form of a microcontroller, Digital Signal Processor (DSP), Central Processing Unit (CPU), Field Programmable Gate Array (FPGA) or any other suitable type of processing unit. An image sensor 110 may also be included and used as the surface upon which the laser beam from the laser projection system will be directed to.

The system 100 may also include a data storage facility 130 configured to store, for example, distance or steering angle data. A communications unit 120 may be included for communicating with the laser projection system via radio frequency, for example for the purposes of receiving operational commands or for transmitting back information pertaining to errors. The processing unit may additionally be operable to control a sound generator unit 150 and generate a unique sound (e.g. an ultra-sound signal) for initial positioning. A reference feature/point, for example such as one embodied as a trackable indicator or active positioning target (APT) which will be discussed in further detail below, may also be configured to transmit its pitch, yaw and roll orientations using an inbuilt sensor 160 to allow the laser projection system to calculate the exact location of the reference feature/point.

According to some embodiments of the invention, the process of determining the projector system's position and orientation may involve a two stage process involving a preliminary or rough-positioning stage and a refined or fine-positioning stage.

In the preliminary or rough positioning stage, the reference point or APT device may be detected to a lower degree of accuracy by several methods such as vision-based detection, radio frequency (RF) signal triangulation, sound triangulation and other methods suitable for rough positioning. For example, in some embodiments sound signals may be utilized. The processing unit may control the sound generator unit (150) to generate a unique sound (e.g. a specifically selected single frequency tone). The laser projection system may then continuously move upon its axes toward the sound captured by its microphone array using known acoustic location algorithms such as sound intensity triangulation, time difference of arrival, particle velocity etc.

Once the laser beam is located over a surface of the reference point or APT device, the refined or fine-positioning stage may be entered into, wherein the processing unit may acquire images from the image sensor and analyze the laser spot position on the image sensor using a laser spot detection algorithm or other suitable algorithm.

According to some embodiments of the invention, if less than three reference points or APT devices are available, additional sensors such as inclinometers or azimuth sensors may be integrated.

According to some embodiments of the invention, the image sensor may be part of a camera, or alternatively it may be part of a direct beam position sensor.

According to some embodiments of the invention, the survey tool may further include a further motorized mirror capable of further steering the beam and mounted on the movable platform.

According to some embodiments of the invention, the survey tool may further include a dynamic focus optics, capable of dynamically changing the light beam focus responsive to instructions from the processing unit.

Figure 3:
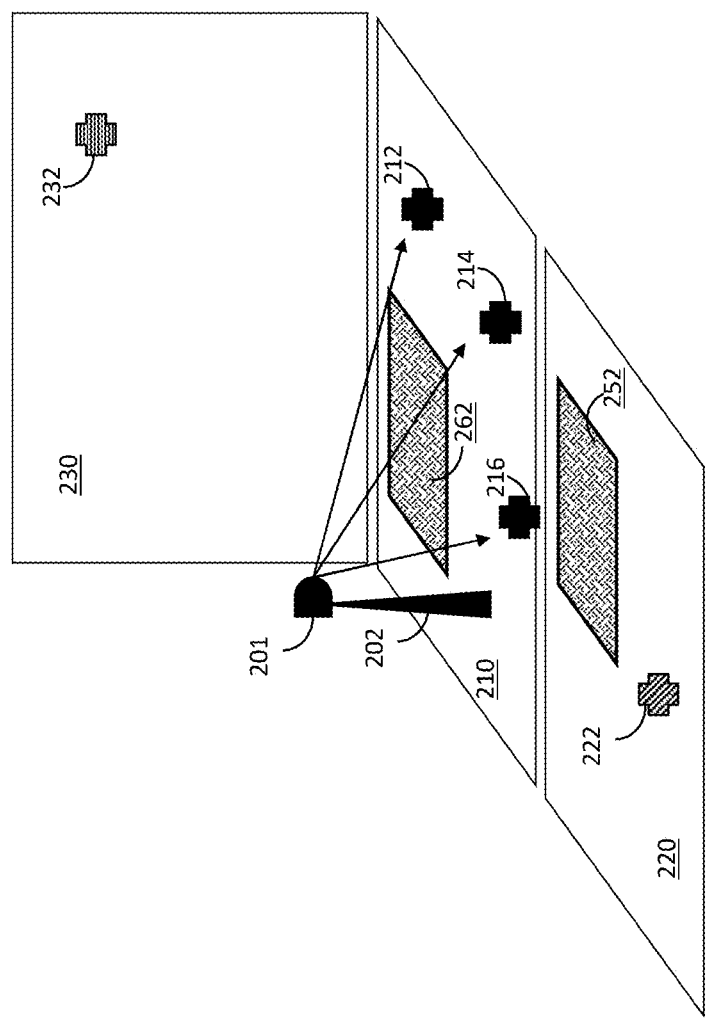
FIG. 3 is a high-level diagram illustrating a laser projector registration process in accordance with some embodiments of the present invention.

FIG. 3 is a high-level diagram illustrating a laser projector registration process in accordance with some embodiments of the invention. Laser projector 201 (e.g. a laser scanner utilizing galvanometers) may be mounted on a movable platform, which itself may be mounted on a support structure 202 (e.g., a tripod arrangement) and located in a construction site featuring a plurality of projection surfaces 210, 220 and 230. In order to be able to cover all three surfaces (which in this environment are beyond the remit of a single FOV of the laser projector 201) the following two-stage process is proposed, in accordance with embodiments of the present invention.

In a first stage, registration is achieved by making steering angle and/or distance measurements on each reference point (e.g. reference points 212, 214 and 216, which all lie within surface 210) and therefrom estimating the position and the orientation of the system. This may be achieved by moving the light scanner mirrors and/or moveable platform until a laser point is positioned on the first reference point; reading the steering angle and/or distance of the first reference point relative to any specified part of the survey tool such as support structure 202; repeating the process for all reference points; and using a triangulation or trilateration algorithm to estimate the position and orientation of the system within the build space. The movement of the light scanner mirrors and/or moveable platform may be controlled manually by an operator using a control device such as, for example, a joystick, or automatically by using a camera in addition with computer vision algorithms to move the laser point towards each reference point. It will be appreciated that any other automated method or algorithm known by those skilled in the art may also be utilized.

In some embodiments, one or more of the reference points may be located beyond the initial FOV of the laser projector 201 (e.g. reference points 222 or 232). In such circumstances, the laser projector 201 may be moved or rotated using the movable platform and/or light scanner mirrors may be used to measure the reference point(s) within and outside of the FOV to collect their data. It should be noted that the order in which each reference point is measured is unimportant, and, in some instances, all reference points may be located outside of the initial FOV of the laser projector 201.

In a second stage, content 262 may be projected in a conformal and registered manner upon one or more projection surfaces 210. In circumstances where several projection tiles may be required, for instance where content 252 is to be projected upon surface 220, the moveable platform and/or light scanner mirrors may be operated to direct laser projector 201 to the required surface without any loss of registration or alignment. This may be done either manually by an operator or automatically through use of suitable computer algorithms using sensor readings obtained from, for example, pan/tilt encoders.

Figure 4A:
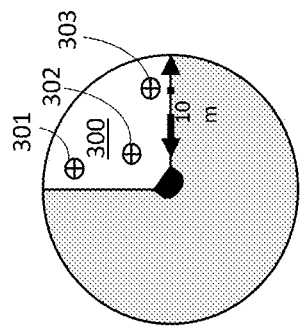
FIGS. 4A, 4B and 4C are high-level diagrams illustrating one use case of a laser projector in accordance with some embodiments of the present invention.
Figure 4B:
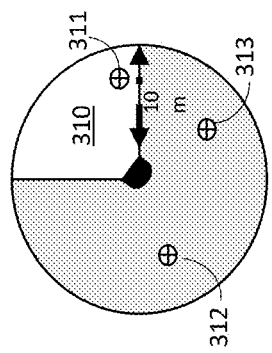
Figure 4C:
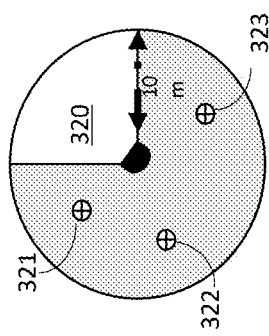

FIGS. 4A, 4B and 4C are high-level diagrams illustrating one use case of a laser projector in accordance with some embodiments of the invention. As shown in FIG. 4A, there may be a plurality of reference points 301, 302 and 303 present on a surface within the build space, wherein each of reference points are located within an initial FOV 300 of the laser projector, providing a relatively simple procedure for the user.

As shown in FIG. 4B, there may alternatively be circumstances where out of three reference points 311, 312 and 313 present on a surface within the build space, only one reference point 311 lies within an initial FOV 310 of the laser projector. Two additional reference points 312 and 313 are therefore located outside of said initial FOV, which will be the usual case for users who may need to realign the laser projector using, for example, the light scanner mirrors and/or moveable platform, to detect the angles and/or ranges of the reference points outside of the initial FOV.

As shown in FIG. 4C, there may also be circumstances where out of three reference points 321, 322 and 323 present on a surface within the build space, none are located within the initial FOV 320 of the laser projector. This use case is more unusual and may present the user with a more challenging process requiring multiple realignments of the laser projector using, for example, the light scanner mirrors and/or moveable platform, to achieve multiple FOVs until all required reference points are detected.

Figure 5B:
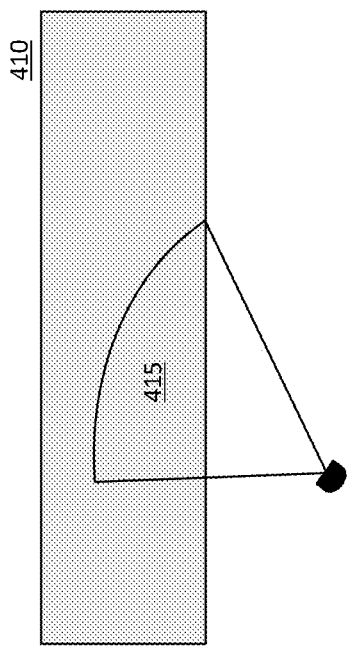
FIGS. 5A and 5B are high-level diagrams illustrating another use case of a laser projector in accordance with some embodiments of the present invention.
Figure 5A:
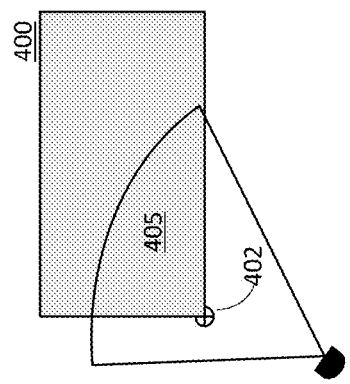

FIGS. 5A and 5B are high-level diagrams illustrating another use case of a laser projector in accordance with some embodiments of the invention. As shown in FIG. 5A, in the use case of projecting content onto a surface such as wall 400, there may be one or more known reference points 402 located within the field of view 405 of the laser projector, in which case the range and/or angle of that reference point may be measured as standard. Alternatively, as shown in FIG. 5B, in the use case of projecting content onto a surface such as wall 410, there may be no known reference points located within the field of view 415 of the laser projector. In such circumstances, the operator may be required to realign to the laser projector using, for example, the light scanner mirrors and/or moveable platform, to obtain a different FOV in order to locate a known reference point and thereafter determine its range and/or angle relative to the laser projector.

Figure 6:
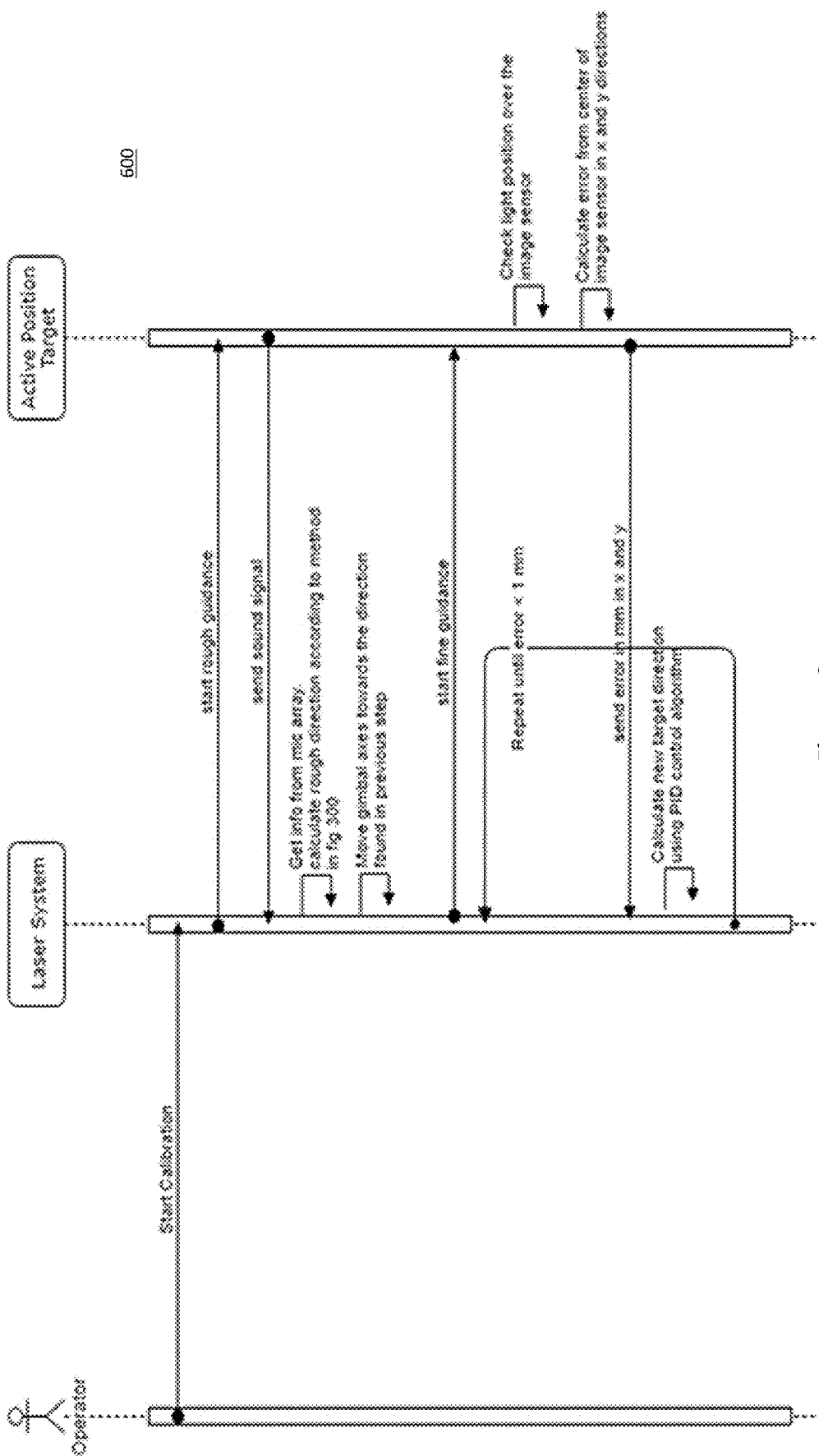
FIG. 6 is a high-level flow diagram illustrating a method in accordance with embodiments of the present invention.

FIG. 6 is a high-level flow diagram illustrating an exemplary method 600 in accordance with embodiments of the present invention. Method 600 depicts a full exemplary sequence of interactions between a laser projection system according to embodiments of the invention and a reference point embodied as an APT device. The sequence commences when an operator or user inputs a request for the laser projection system to begin an environment registration/calibration process. In some embodiments, this may be achieved by pushing a button on the laser projection system or by inputting/sending a command from, for example, a mobile app or HMI. The laser system may begin scanning for existing APT devices located within its range. For each identified APT device the laser system may send a command to initiate preliminary or rough-positioning guidance, which will cause the APT device to continuously generate a signal, for example a sound or radio frequency (RF) signal. The emitted signal may be captured by, for example, a microphone/antenna array of the laser projection system and may be used to calculate the specific direction in which to move the laser projection system axes, in order to roughly point towards the APT device in question.

According to some embodiments of the invention, an additional step may be conducted to increase the accuracy of the rough positioning, in particular by adding a camera component to the laser projection system which may assist in directing the laser beam to a surface of the APT device, using computer vision methods or the like.

Once the preliminary or rough-positioning step is complete, the APT device and the laser projection system may begin a refined or fine-positioning step. To achieve this, the APT device may be configured to continuously acquire images, recognizing the center of the laser spot on an image sensor of the APT device and sending the error of the laser spot relative to a center of the image sensor back to the laser projection system, for example in units of millimeters or pixels.

The laser projection system may continue to redirect itself towards the center of the APT device using any appropriate control algorithm, such as a Proportional Integral Derivative (PID) controller, to provide a control loop feedback mechanism with which to minimize the error to a suitable degree to ensure that the distance between the laser beam spot and the center of the image sensor of the APT device is lower than some predefined threshold. In some embodiments, this error threshold may be <1 mm. Once this is achieved, the laser system may record the location of the APT device and orientation together with the position and orientation of the laser projection system itself.

Figure 7:
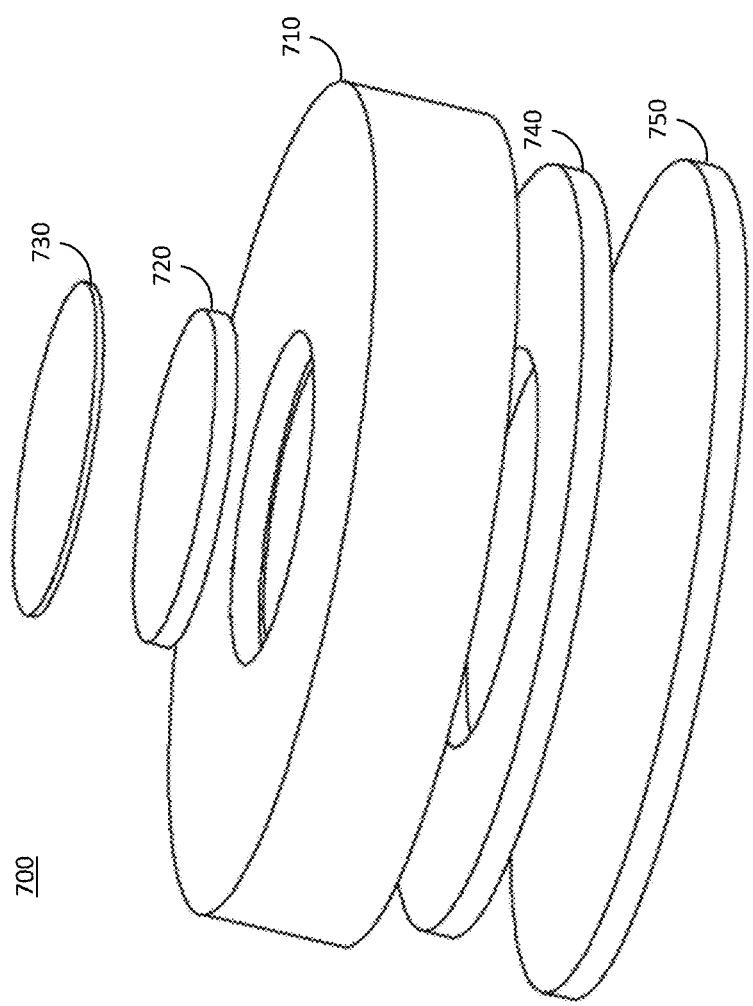
FIG. 7 is a high-level diagram illustrating an exemplary APT device in accordance with embodiments of the present invention.

FIG. 7 is a high-level diagram illustrating an exemplary electro-optic APT device 700 in accordance with embodiments of the invention. The APT device may comprise a disk-shaped case 710 configured to enclose a Printed Circuit Board (PCB) 740 which may include, for example, the gyro sensor component 160 of laser projection system 100 (see FIG. 2b). The enclosure may be closed by a case cover 750. An image sensor may also be located on the PCB, for example, in some embodiments, in its center. Above the image sensor, the APT device may additionally comprise a lens 720 and a filter 730 operable to transmit, for example, only the narrowband wavelength (e.g., 532 nm) corresponding to the laser beam emitted from the laser projection system.

According to some embodiments of the invention, a rechargeable battery may also be included in the enclosure to provide power to the PCB components. The APT device 700 may be fully mobile and thus may not require any power cable during usage. The device may also be charged in a designated charging unit, as required.

According to some embodiments of the invention, the geometric computation carried out by the laser projection system may comprise a triangulation or trilateration process.

According to some embodiments of the invention, an operator may record the coordinates of a reference point onto an APT device via a mobile application.

According to some embodiments of the invention, a user may record the coordinates of a reference point onto an APT device via a human-machine interface "HMI".

According to some embodiments of the invention, position data may be recorded onto an APT device using a positioning sensor system, such as a Global Positioning Satellite (GPS) sensor system.

According to some embodiments of the invention, the preliminary or rough-positioning signal generator may be a sound generator.

According to some embodiments of the invention, the preliminary or rough-positioning signal generator may be Bluetooth 5.1.

According to some embodiments of the invention, the at least one light source comprises a laser.

According to some embodiments of the invention, the at least one sensor comprises a laser distance meter.

According to some embodiments of the invention, the at least one sensor comprises a rotary encoder.

According to some embodiments of the invention, the at least one two-axis electro-optic deflection unit has a steering angle narrower than that of the steering angle of the moveable platform, and wherein the at least one two-axis electro-optic deflection unit has an angular velocity higher than that of the angular velocity of the moveable platform.

According to some embodiments of the invention, the at least one two-axis electro-optic deflection unit comprises a galvanometer and wherein the moveable platform comprises a pan/tilt gimbal.

According to some embodiments of the invention, the survey tool further comprises at least one inclination sensor configured to record an inclination angle of the survey tool relative to an Earth centered frame of reference.

According to some embodiments of the invention, the survey tool further comprises at least one three-dimensional (3D) camera configured to record a 3D model of at least one of: the construction site; and, objects and people within the construction site.

According to some embodiments of the invention, the survey tool further comprises at least one two-dimensional (2D) camera configured to record 2D images of at least one of: the construction site; and, objects and people within the construction site.

According to some embodiments of the invention, the survey tool further comprises deriving a 3D model of the construction site by projecting laser patterns onto one or more surfaces within the construction site and recording the projected pattern with the 2D camera, and therefrom calculating the 3D model based on the recorded pattern.

According to some embodiments of the invention, the determined P&O of the survey tool relative to the construction site comprises 6 degrees of freedom (6DOF).

According to some embodiments of the invention, the at least one sensor is configured to record at least two steering angles or at least two distances to at least two different points on surfaces within the construction site, wherein coordinates of the points are known within the construction site and the construction plan, and wherein the at least one computer processor is configured to determine the P&O of the survey tool using triangulation or trilateration based on additional data and at least one of: the at least two steering angles; and, the at least two distances to the at least two different points.

According to some embodiments of the invention, the additional data comprises at least one of: pre-existing knowledge including the coordinates of an additional point within the construction site; coordinates of the survey tool within the construction site; a height and azimuth of the survey tool; and, an inclination angle of the survey tool relative to an Earth centered frame of reference or a surface and azimuth.

According to some embodiments of the invention, the computer processor is further configured to instruct the survey tool to: perform depth scanning of at least three points within the construction site and therefrom estimate a 3D model of at least one surface within the construction site; calculate a projection image which includes a portion of a 2D construction plan featuring one or more physical objects appearing within the construction site, wherein the projection image is adjusted based on the estimated 3D model; project the projection image onto the at least one surface of the construction site, wherein the projection image is rendered at a scale corresponding to the dimensions of the at least one surface; steer the projection image to align with the one or more physical objects appearing within the construction site; and, calculate the P&O of the survey tool based on the P&O of the projected projection image.

According to some embodiments of the invention, the computer processor is further configured to vary at least one of: the steering angle of the light beam aimed at a surface within the construction site; and, the distance between the survey tool and a surface within the construction site, to automatically locate a point by: attaching at least one trackable indicator to a surface within the construction site to define said point at a predefined location, wherein the at least one trackable indicator comprises: an ultrasound (US) beacon, a radio frequency (RF) beacon, or a visual indicator; carrying out preliminary tracking for the point using one or more of: an US tracker, a RF tracker, or an optical tracker, to identify a sector of the construction site that includes the point; refining the preliminary tracking of the point by projecting a collimated light beam at the identified sector of the construction site; and, using an active or passive feedback mechanism in relation to the projected collimated light beam to determine an accurate direction of the point relative to the survey tool.

According to some embodiments of the invention, the at least one sensor is configured to record at least two steering angles or at least two distances to at least two different points on surfaces within the construction site, wherein coordinates of the points are known within the construction site and construction plan, and wherein the at least one computer processor is configured to determine the P&O of the survey tool using triangulation or trilateration based on additional data and at least one of: the at least two steering angles; and, the at least two distances to the at least two different points.

According to some embodiments of the invention, the additional data comprises at least one of: pre-existing knowledge including the coordinates of an additional point within the construction site; coordinates of the survey tool within the construction site; a height and azimuth of the survey tool; and an inclination angle of the survey tool relative to an Earth centered frame of reference or a surface and azimuth.

According to some embodiments of the invention, steering the at least one light source further comprises: capturing, using a camera, images of a light spot of said light beam on one or more surface within the construction site; displaying the captured images of the light spot on a display to a user; overlaying a cursor at a desired location for the light spot on the displayed images; and, automatically steering the light beam towards the desired location responsive to an input made by the user in relation to the cursor.

According to some embodiments of the invention, the computer processor is further configured to: obtain a floor plan of the construction site; obtain coordinates of a first position of the survey tool within the construction site; scan the construction site from the first position and therefrom construct a position map of the first position, wherein upon a re-stationing the survey tool to a second position within the construction site, the computer processor is further configured to: scan the construction site from the second position and therefrom construct a position map of the second position; and, calculate a displacement vector denoting the re-stationing of the survey tool from the first position to the second position by comparing the position map of the second position to the position map of the first position.

According to some embodiments of the invention, the computer processor is further configured to: obtain a floor plan of the construction site; obtain coordinates of a first position of the survey tool within the construction site; scan the construction site from the first position and therefrom construct a position map of the first position; register the position map of the first position onto the floor plan, to yield a registered position map of the first position, wherein upon a re-stationing the survey tool to a second position within the construction site, the computer processor is further configured to: scan the construction site from the second position and therefrom construct a position map of the second position; and, calculate a displacement vector denoting the re-stationing of the survey tool from the first position to the second position by comparing the position map of the second position to the registered position map of the first position.

According to some embodiments of the invention, a dual registration-projection system is proposed, comprising: a two-dimensional light projector comprising a light scanner configured to direct a light beam in selected directions with measurable angles within a field of view "FOV"; and, a computer processor configured to: receive three or more readings of angles of the light beam responsive to directing the light beam to three or more reference points having known locations within a construction site and a floor plan; register, based on the readings and other positional data inputs, the position and orientation of the light projector within the construction site; and instruct the light projector to project a floor plan portion onto a surface within the construction site, wherein said floor plan portion is registered to said surface.

According to some embodiments of the invention, a method of dual registration and projection within a scene is proposed, comprising the steps of: pointing a directional light beam from a light projector at two or more reference points within a field of view "FOV"; automatically monitoring the angles and/or ranges of the two or more reference points; acquiring the position and orientation of each of the two or more reference points relative to the light scanner;

registering based on the readings and other positional data inputs the position and orientation of the light scanner within the scene; and projecting predefined content upon a first surface within the scene.

According to some embodiments of the invention, a system for automatic positioning of a laser projection system within a site is proposed, comprising: a plurality of Active Positioning Target "APT" devices comprising: a processing unit, an image sensor, a radio frequency "RF" communication device and a rough-positioning signal generator; a plurality of reference points located in a scene; and a laser projection system; wherein an individual APT device is configured to store the recorded coordinates of an identified reference point and be placed atop said reference point; said APT device is configured to guide a laser beam from the laser projection system firstly using said rough-positioning signal generator and secondly using said image sensor to fine tune the direction of said laser beam towards its center; and said fine tuning is looped iteratively to more accurately direct the laser beam; wherein at least three reference point positions are identified, and their associated APT devices are in communication with the laser projection system which is configured to determine the position of said laser projection system via geometric computation of the reference point positions.

According to some embodiments of the invention, a method of automatic positioning of a laser projection system within a site is proposed, comprising: identifying a physical reference point within a scene; recording the coordinates of the reference point into an Active Positioning Target "APT" device; placing the active APT device upon the reference point; wherein the identifying, recording and placing is repeated until three or more reference points are identified with corresponding active APT devices; and calibrating said laser projection system by: generating a rough position signal from the APT; guiding a laser beam from the projection system using said signal; and fine tuning the guiding of the laser beam using an inbuilt image sensor within the APT; and iteratively looping the fine tuning to direct the laser beam to the center of the image sensor; and determining the laser projection system position via a geometric computation of the three or more reference point positions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system".

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A survey tool for determining position and orientation (P&O) thereof relative to a construction site, the survey tool comprising:
    a support structure;
    a moveable platform connected to the support structure, wherein the moveable platform is configured to rotate at least one two-axis electro-optic deflection unit mounted on the moveable platform;
    at least one light source coupled to the two-axis electro-optic deflection unit configured to project a light beam, wherein steering of the light beam is carried out by operating at least one of: the two-axis electro-optic deflection unit, and the moveable platform, and wherein the light beam forms a projection onto surfaces within the construction site comprising at least one of: a portion of a construction plan, or a specified pattern;
    at least one sensor configured to record at least one of: a steering angle of the light beam relative to a part of the survey tool when aimed at a point on one of the surfaces within the construction site; and a distance between the survey tool and said point;
    at least one computer processor configured to determine the P&O of the survey tool relative to the construction site, based on at least one of: said steering angle; and said distance,
    wherein the computer processor is further configured to instruct the survey tool to:
    perform depth scanning of at least three points within the construction site and therefrom estimate a 3D model of at least one surface within the construction site;
    calculate a projection image which includes a portion of a 2D construction plan featuring one or more physical objects appearing within the construction site, wherein the projection image is adjusted based on the estimated 3D model; and
    project the projection image onto the at least one surface of the construction site, wherein the projection image is rendered at a scale corresponding to the dimensions of the at least one surface;
    at least one two-dimensional (2D) camera configured to record 2D images of at least one of: the construction site; and objects and people within the construction site; and
    a 3D model of the construction site by projecting laser patterns onto one or more surfaces within the construction site and recording the projected pattern with the 2D camera, and therefrom calculating the 3D model based on the recorded pattern.

2. The survey tool according to claim 1, wherein the at least one two-axis electro-optic deflection unit has a steering angle narrower than that of the steering angle of the moveable platform, and wherein the at least one two-axis electro-optic deflection unit has an angular velocity higher than that of the angular velocity of the moveable platform.

3. The survey tool according to claim 1, wherein the at least one two-axis electro-optic deflection unit comprises a galvanometer and wherein the moveable platform comprises a pan/tilt gimbal.

4. The survey tool according to claim 1, further comprising at least one inclination sensor configured to record an inclination angle of the survey tool relative to an Earth centred frame of reference.

5. The survey tool according to claim 1, further comprising at least one three-dimensional (3D) camera configured to record a 3D model of at least one of: the construction site; and, objects and people within the construction site.

6. The survey tool according to claim 1, wherein the determined P&O of the survey tool relative to the construction site comprises 6 degrees of freedom (6DOF).

7. The survey tool according to claim 1, wherein the at least one sensor is configured to record at least two steering angles or at least two distances to at least two different points on surfaces within the construction site, wherein coordinates of the points are known within the construction site and the construction plan, and wherein the at least one computer processor is configured to determine the P&O of the survey tool using triangulation or trilateration based on additional data and at least one of: the at least two steering angles; and, the at least two distances to the at least two different points.

8. The survey tool according to claim 7, wherein the additional data comprises at least one of: pre-existing knowledge including the coordinates of an additional point within the construction site; coordinates of the survey tool within the construction site; a height and azimuth of the survey tool; and an inclination angle of the survey tool relative to an Earth centred frame of reference or a surface and azimuth.

9. A survey tool for determining position and orientation (P&O) thereof relative to a construction site, the survey tool comprising:
    a support structure;
    a moveable platform connected to the support structure, wherein the moveable platform is configured to rotate at least one two-axis electro-optic deflection unit mounted on the moveable platform;
    at least one light source coupled to the two-axis electro-optic deflection unit configured to project a light beam, wherein steering of the light beam is carried out by operating at least one of: the two-axis electro-optic deflection unit, and the moveable platform, and wherein the light beam forms a projection onto surfaces within the construction site comprising at least one of: a portion of a construction plan, or a specified pattern;
    at least one sensor configured to record at least one of: a steering angle of the light beam relative to a part of the survey tool when aimed at a point on one of the surfaces within the construction site; and, a distance between the survey tool and said point; and
    at least one computer processor configured to determine the P&O of the survey tool relative to the construction site, based on at least one of: said steering angle; and, said distance, wherein the computer processor is further configured to instruct the survey tool to:
perform depth scanning of at least three points within the construction site and therefrom estimate a 3D model of at least one surface within the construction site;
calculate a projection image which includes a portion of a 2D construction plan featuring one or more physical objects appearing within the construction site, wherein the projection image is adjusted based on the estimated 3D model;
project the projection image onto the at least one surface of the construction site, wherein the projection image is rendered at a scale corresponding to the dimensions of the at least one surface;
steer the projection image to align with the one or more physical objects appearing within the construction site; and,
calculate the P&O of the survey tool based on the P&O of the projected projection image.

10. A survey tool for determining position and orientation (P&O) thereof relative to a construction site, the survey tool comprising:
a support structure;
a moveable platform connected to the support structure, wherein the moveable platform is configured to rotate at least one two-axis electro-optic deflection unit mounted on the moveable platform;
at least one light source coupled to the two-axis electro-optic deflection unit configured to project a light beam, wherein steering of the light beam is carried out by operating at least one of: the two-axis electro-optic deflection unit, and the moveable platform, and wherein the light beam forms a projection onto surfaces within the construction site comprising at least one of: a portion of a construction plan, or a specified pattern;
at least one sensor configured to record at least one of: a steering angle of the light beam relative to a part of the survey tool when aimed at a point on one of the surfaces within the construction site; and a distance between the survey tool and said point; and
at least one computer processor configured to determine the P&O of the survey tool relative to the construction site, based on at least one of: said steering angle; and, said distance,
wherein the computer processor is further configured to vary at least one of: the steering angle of the light beam aimed at a surface within the construction site; and the distance between the survey tool and a surface within the construction site, to automatically locate a point by:
attaching at least one trackable indicator to a surface within the construction site to define said point at a predefined location, wherein the at least one trackable indicator comprises: an ultrasound (US) beacon, a radio frequency (RF) beacon, or a visual indicator;
carrying out preliminary tracking for the point using one or more of: an US tracker, a RF tracker, or an optical tracker, to identify a sector of the construction site that includes the point;
refining the preliminary tracking of the point by projecting a collimated light beam at the identified sector of the construction site; and,
using an active or passive feedback mechanism in relation to the projected collimated light beam to determine an accurate direction of the point relative to the survey tool.

11. The survey tool according to claim 10, wherein the at least one sensor is configured to record at least two steering angles or at least two distances to at least two different points on surfaces within the construction site, wherein coordinates of the points are known within the construction site and construction plan, and wherein the at least one computer processor is configured to determine the P&O of the survey tool using triangulation or trilateration based on additional data and at least one of: the at least two steering angles; and, the at least two distances to the at least two different points.

12. The survey tool according to claim 11, wherein the additional data comprises at least one of: pre-existing knowledge including the coordinates of an additional point within the construction site; coordinates of the survey tool within the construction site; a height and azimuth of the survey tool; and an inclination angle of the survey tool relative to an Earth centred frame of reference or a surface and azimuth.

13. The survey tool according to claim 1, wherein steering the at least one light source further comprises:
capturing, using a camera, images of a light spot of said light beam on one or more surface within the construction site;
displaying the captured images of the light spot on a display to a user;
overlaying a cursor at a desired location for the light spot on the displayed images; and,
automatically steering the light beam towards the desired location responsive to an input made by the user in relation to the cursor.

14. A survey tool for determining position and orientation (P&O) thereof relative to a construction site, the survey tool comprising:
a support structure;
a moveable platform connected to the support structure, wherein the moveable platform is configured to rotate at least one two-axis electro-optic deflection unit mounted on the moveable platform;
at least one light source coupled to the two-axis electro-optic deflection unit configured to project a light beam, wherein steering of the light beam is carried out by operating at least one of: the two-axis electro-optic deflection unit, and the moveable platform, and wherein the light beam forms a projection onto surfaces within the construction site comprising at least one of: a portion of a construction plan, or a specified pattern;
at least one sensor configured to record at least one of: a steering angle of the light beam relative to a part of the survey tool when aimed at a point on one of the surfaces within the construction site; and a distance between the survey tool and said point; and
at least one computer processor configured to determine the P&O of the survey tool relative to the construction site, based on at least one of: said steering angle; and said distance,
wherein the computer processor is further configured to:
obtain a floor plan of the construction site;
obtain coordinates of a first position of the survey tool within the construction site;
scan the construction site from the first position and therefrom construct a position map of the first position,
wherein upon a re-stationing the survey tool to a second position within the construction site, the computer processor is further configured to:
scan the construction site from the second position and therefrom construct a position map of the second position; and,
calculate a displacement vector denoting the re-stationing of the survey tool from the first position to the second position by comparing the position map of the second position to the position map of the first position.

15. The survey tool according to claim 1, wherein the computer processor is further configured to:
    obtain a floor plan of the construction site;
    obtain coordinates of a first position of the survey tool within the construction site;
    scan the construction site from the first position and therefrom construct a position map of the first position;
    register the position map of the first position onto the floor plan, to yield a registered position map of the first position,
    wherein upon a re-stationing the survey tool to a second position within the construction site, the computer processor is further configured to:
    scan the construction site from the second position and therefrom construct a position map of the second position; and,
    calculate a displacement vector denoting the re-stationing of the survey tool from the first position to the second position by comparing the position map of the second position to the registered position map of the first position.

16. The survey tool according to claim 1 further comprising a further motorized mirror capable of further steering the beam and mounted on the movable platform.

17. The survey tool according to claim 1, further comprising a dynamic focus optics, capable of dynamically changing the light beam focus responsive to instructions from the processing unit.

18. A method for automatically locating a point with a survey tool within a construction site, the survey tool comprising a support structure, a moveable platform, a laser mounted on the moveable platform and a computer processor configured to control at least one of: a steering angle of the laser relative to a part of the survey tool; and a distance between the survey tool and the point, wherein the method comprises:
    attaching at least one trackable indicator to a surface within the construction site to define said point at a predefined location, wherein the at least one trackable indicator comprises: an ultrasound (US) beacon, a radio frequency (RF) beacon, or a visual indicator;
    carrying out preliminary tracking for the point using one or more of: an US tracker, a RF tracker, or an optical tracker, to identify a sector of the construction site that includes the point;
    refining the preliminary tracking of the point by projecting a laser beam at the identified sector of the construction site; and,
    using an active or passive feedback mechanism in relation to the projected laser beam to determine an accurate direction of the point relative to the survey tool.

* * * * *